(12) United States Patent
Osborne et al.

(10) Patent No.: US 7,368,193 B2
(45) Date of Patent: May 6, 2008

(54) TEMPERATURE-BASED VEHICLE WAKEUP STRATEGY TO INITIATE FUEL CELL FREEZE PROTECTION

(75) Inventors: Kurt Osborne, Dearborn, MI (US); Milos Milacic, New Boston, MI (US); William Sanderson, Waterford, MI (US); Fred Brighton, Ann Arbor, MI (US); Jon Beasley, Dearborn, MI (US); Donald Franks, Linden, MI (US); Richard Scholer, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/161,592

(22) Filed: Aug. 9, 2005

(65) Prior Publication Data

US 2005/0257969 A1 Nov. 24, 2005

Related U.S. Application Data

(63) Continuation-in-part of application No. 10/708,383, filed on Feb. 27, 2004, now Pat. No. 7,270,903.

(51) Int. Cl.
H01M 8/04 (2006.01)

(52) U.S. Cl. .......................................... 429/13; 429/24

(58) Field of Classification Search ...................... None
See application file for complete search history.

(56) References Cited

U.S. PATENT DOCUMENTS

| | | | |
|---|---|---|---|
| 6,068,941 A | 5/2000 | Fuller et al. | |
| 6,087,028 A | 7/2000 | Goto | |
| 6,186,254 B1 | 2/2001 | Mullford et al. | |
| 6,358,637 B1 | 3/2002 | Fuss | |
| 6,394,207 B1 | 5/2002 | Skala | |
| 6,855,444 B2 | 2/2005 | Morishima et al. | |
| 6,893,758 B2 | 5/2005 | Miyazawa et al. | |
| 6,905,791 B2 | 6/2005 | Busenbender | |
| 7,122,259 B2 | 10/2006 | Takahashi | |
| 2004/0219401 A1* | 11/2004 | Hobmeyr et al. | ............. 429/13 |
| 2005/0255351 A1 | 11/2005 | Takashi | |

* cited by examiner

*Primary Examiner*—John S. Maples
(74) *Attorney, Agent, or Firm*—Damian Porcari; Brooks Kushman P.C.

(57) ABSTRACT

A method of removing moisture from a fuel cell stack. The presence of liquid water in a fuel cell stack is especially undesirable should the temperature drop below freezing since the structures within the fuel cell are subject to degradation. One method includes measuring the temperature in the vicinity of a fuel cell vehicle when the fuel cell vehicle has been shut down and measuring the time elapsed since fuel cell vehicle shut off, and then flowing a moisture-removing medium through the fuel cell when the ambient temperature drops to a predetermined temperature and a time delay condition is satisfied. The moisture-removing medium is flowed through the fuel cell for a sufficient time to remove a sufficient amount of the water to inhibit degradation by freezing of water. A system which implements the method of the present invention is also provided.

18 Claims, 4 Drawing Sheets

140
TEMPERATURE-BASED VEHICLE WAKEUP STRATEGY TO INITIATE FUEL CELL FREEZE PROTECTION

CROSS-REFERENCE TO RELATED APPLICATION

This application is a continuation-in-part of U.S. patent application Ser. No. 10/708,383, filed on Feb. 27, 2004, and issued on Sep. 18, 2007 as U.S. Pat. No. 7,270,903, which is hereby incorporated by reference.

BACKGROUND OF THE INVENTION

1. Field of the Invention

The present invention relates to methods and systems for removing moisture from a vehicle fuel cell during periods of non-operation to prevent degradation by freezing.

2. Background Art

Fuel cells are devices that produce electricity by an electrochemical process without the need for fuel combustion. In the typical fuel cell, hydrogen gas and oxygen gas are electrochemically combined to produce electricity. The hydrogen used in this process may be obtained from natural gas or methanol while air provides the oxygen source. The only by-products of this process are water vapor and heat. Accordingly, fuel cell-powered electric vehicles reduce emissions and the demand for conventional fossil fuels by eliminating the internal combustion engine (e.g., in completely electric vehicles) or operating the engine at only its most efficient/preferred operating points (e.g., in hybrid electric vehicles). However, while fuel cell-powered vehicles have reduced harmful vehicular emissions, they present other drawbacks.

The typical fuel cell, by way of example, includes an anode and a cathode which are separated by a polymeric electrolyte or proton exchange membrane (PEM). Each of the two electrodes may be coated with a thin layer of catalysts such as platinum. At the anode, the hydrogen is catalytically broken down into electron and hydrogen ions (protons). The electron provides the electricity as the hydrogen ion moves through the polymeric membrane towards the cathode. At the cathode, the hydrogen ions combine with oxygen from the air and electrons to form water. In a typical automotive application the high power demands necessitate that a number of fuel cells will be combined together to form a fuel cell stack.

Although present fuel cell technology has shown marked improvement in automobile applications, there is a tendency for water to remain in the fuel cell stack and related components of the system when a vehicle is shut down after operation. Such remaining water has been found to degrade stack performance, especially in cold weather environments when the temperature drops below the freezing point of water. The formation of ice particles may for example degrade the polymeric membrane of a PEM fuel cell or degrade other components in the system such as deionized water lines.

Accordingly, there is a need for an improved fuel cell system and methods for removing water from a fuel cell stack and system before such water can freeze and degrade the fuel cell structures and other system components.

SUMMARY OF THE INVENTION

The present invention overcomes the problems of the prior art by providing in one embodiment a method of removing moisture from a fuel cell system and other system components. The presence of liquid water in a fuel cell stack, for example, is especially undesirable should the temperature drop below freezing since the fuel cell stack components are subject to degradation and even damage by ice formation and expansion. The method of the invention is advantageously applied to protect any fuel cell component that might be degraded by freezing. Moreover, the utilization of the method of the invention is not only restricted to PEM fuel cells but it may also be used to protect sensitive components of other types of fuel cells such as solid oxide fuel cells. The method of the invention includes measuring the ambient temperature in the vicinity of a fuel cell when a vehicle ignition has been turned off and then flowing a moisture-removing medium such as air through the fuel cell when the ambient temperature drops to a predetermined temperature. The moisture-removing medium is channeled through the fuel cell for a sufficient time to remove a sufficient amount of the water in the fuel cell system as to protect the fuel cell from freezing. The fuel cell stack is comprised of many individual cells that are stacked together electrically in series to achieve a power source with a given voltage and current. It requires, in this implementation, air and hydrogen from an external source to generate electricity. Product water resulting from the combination of oxygen and hydrogen is managed within the fuel cell system by the method of the present invention. It is this product water which is removed by the method of the invention. Liquid coolant is also supplied to the fuel cell stack as needed to maintain an appropriate operating temperature.

In yet another embodiment of the present invention, a system for removing moisture from a fuel cell in a vehicle utilizing the methods of the invention is provided. The system of the invention includes a temperature measuring device that measures the temperature in the vicinity of a fuel cell in a vehicle, a source of a moisture-removing medium, a conduit for transporting the moisture-removing medium to the fuel cell, and a controller that receives temperature data from the temperature measuring device. The temperature controller initiates a medium-flowing event in which moisture-removing medium is forced through the fuel cell and system when the ambient temperature drops below a predetermined temperature. The controller remembers that a medium-flowing event has occurred during a given engine shut off period, so that if the vehicle warms up above the predetermined temperature and then subsequently drops below the predetermined temperature, a subsequent medium-flowing event is not initiated until the vehicle goes through another engine turn on and shut down cycle. As set forth above, the temperature measuring device measures the ambient temperature continuously or at successive time intervals while the vehicle is not operational. The predetermined temperature will be the same as set forth above for the methods of the invention.

According to another embodiment of the present invention, a method of freeze protection for a fuel cell powered vehicle is provided in which the elapsed time since fuel cell vehicle shut down is measured. The flow of moisture removing medium to the fuel cell is provided when the time elapsed meets a time delay condition and the ambient temperature drops to a predetermined temperature. The time delay condition can be the passage of a time delay period. The time delay period can be at least partially a function of one or more of thermal mass and thermal conductivity of the fuel cell system. The time delay period can be set based on an ambient temperature and a fuel cell system temperature. In certain applications, the time delay period is in the range of about 40-60 minutes.

DETAILED DESCRIPTION

Reference will now be made in detail to presently preferred compositions or embodiments and methods of the invention, which constitute the best modes of practicing the invention presently known to the inventors.

Figure 1:
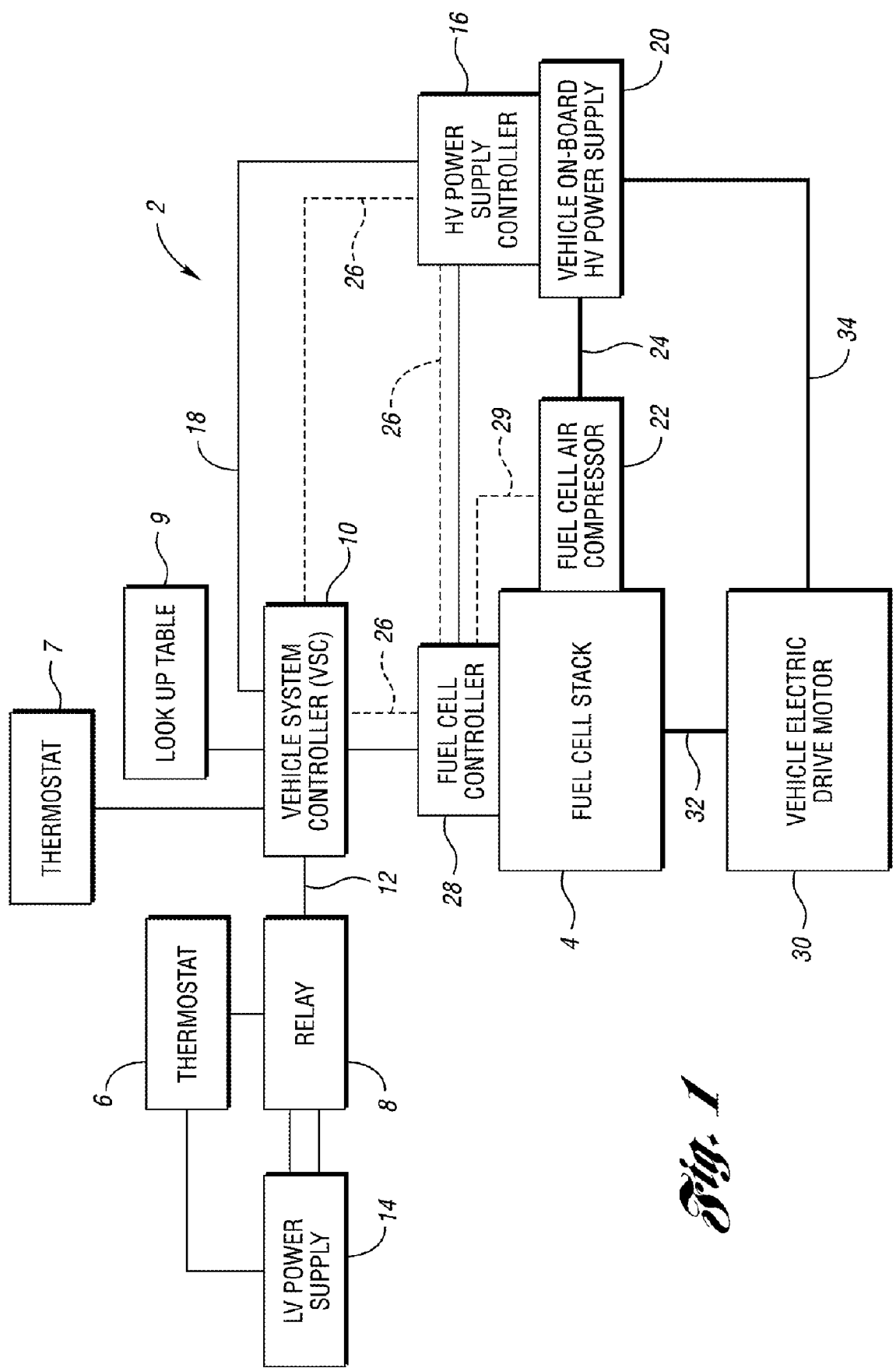
FIG. 1 is a schematic of the fuel cell water purging system of the invention.

With reference to FIG. 1, a schematic of the system of the invention is provided. The system of the invention is utilized to protect a fuel cell-powered vehicle from freezing. This system has been evaluated on the Ford Motor Company's C264 fuel cell vehicle confirmation prototypes, available as the Ford Focus FCV-Hybrid. System 2 includes measuring the temperature in the vicinity of fuel cell stack 4 via thermostat 6. System 2 can also include thermostat 7 for sensing the temperature of the fuel cell system.

Ballard fuel cells have been used in this system. In certain embodiments, a Ballard Mark 9 fuel cell can be utilized. The Ford Focus FCV-Hybrid utilizes the Ballard Mark 9 fuel cell. However, the system and methods of the present invention may utilize virtually any type of fuel cell. Additional examples include the Ballard Mark 5 or 7 fuel cells. Thermostat 6 may be substituted with any suitable temperature sensor. Thermostat 6 is a temperature sensing device that is used to sense the ambient temperature of the fuel cell system or the inline coolant that is supplied to fuel cell stack 4. The output signal from this device is the signal that controls the relay 8. When the temperature drops below a predetermined temperature relay 8 is triggered and sends a signal to vehicle system controller 10 via input 12. Vehicle system controller 10 is the main or master microcontroller present in the vehicle. In certain embodiments, vehicle system controller 10 is connected to and has access to a look up table 9, which can be stored in computer memory. Look up table 9 contains temperature data, and more specifically, ambient and fuel cell system temperature data, correlated to heat transfer differential and time period. These concepts are described in greater detail below. This controller acts as a master controller that controls the overall vehicular control in this distributed controller architecture. Both thermostat 6 and relay 8 are powered by low voltage power supply 14. Relay 8 is a typical automotive relay that is used to provide control of low voltage power supply 14. When it receives a control signal from thermostat 6, it provides low voltage power to the vehicle system controller, which turns it on. Low voltage power supply 14 is a conventional low-voltage (12V) battery found in present-day vehicles. Alternatively, power supply 14 can be supplied by dc/dc convertor connected to a high voltage source.

Upon receiving the signal from relay 8, vehicle system controller 10 sends a signal to a high voltage supply controller 16 via connection 18 which activates high voltage supply 20 to turn on fuel cell air compressor 22 via connection 24 to flow air through fuel stack 4. It should be appreciated that air will also be directed through any fuel cell component that may be damaged by freezing such as deionized water ("DI") lines and associated components. Moreover, if air is not used as the moisture-removing medium air compressor 22 will be replaced with a tank containing the moisture-removing medium. Fuel cell air compressor 22 is a high-speed, microcontroller-based electromechanical device that compresses air entering the fuel cell system to a pressure above ambient to increase operational efficiency of the fuel cell system. Vehicle system controller 10 also communicates with high voltage power supply controller 16 via vehicle multiplex communication network 26 and with fuel cell controller 28. Secondary bus 29 allows communication between fuel cell controller 28 and air compressor 22.

High voltage power supply 16 is the high voltage traction battery that provides an alternative source of power to drive the electric drive motor. High voltage power supply controller 16 is a slave microcontroller responsible for control of the high voltage bus. One function is to maintain the correct bus voltage given two high voltage sources: the fuel cell stack and the high voltage battery. Fuel cell controller 28 is microcontroller that is part of the distributed controller architecture in the fuel cell vehicle. In the control hierarchy, it is a slave controller that responds to the master controller, the vehicle system controller 10. The fuel cell controller provides localized control over the entire fuel cell system, a subsystem of the vehicle. The fuel cell system includes the fuel cell stack and other necessary auxiliary devices that are used to regulate and control air, hydrogen, water, and coolant within the fuel cell system. As an analogy, the fuel cell system is like an internal combustion engine that includes the air intake and manifolding, the fuel delivery system up to the fuel tank, and all associated sensors and actuators. Finally, vehicle electric drive motor 30 is powered by fuel cell stack 4 via bus 32 and by high voltage supply 20 via high voltage bus 34. Vehicle electric drive motor 30 is a tractive motor that drives the wheels of the vehicle. It is powered by fuel cell stack 4 and high voltage power supply 16.

Figure 2:
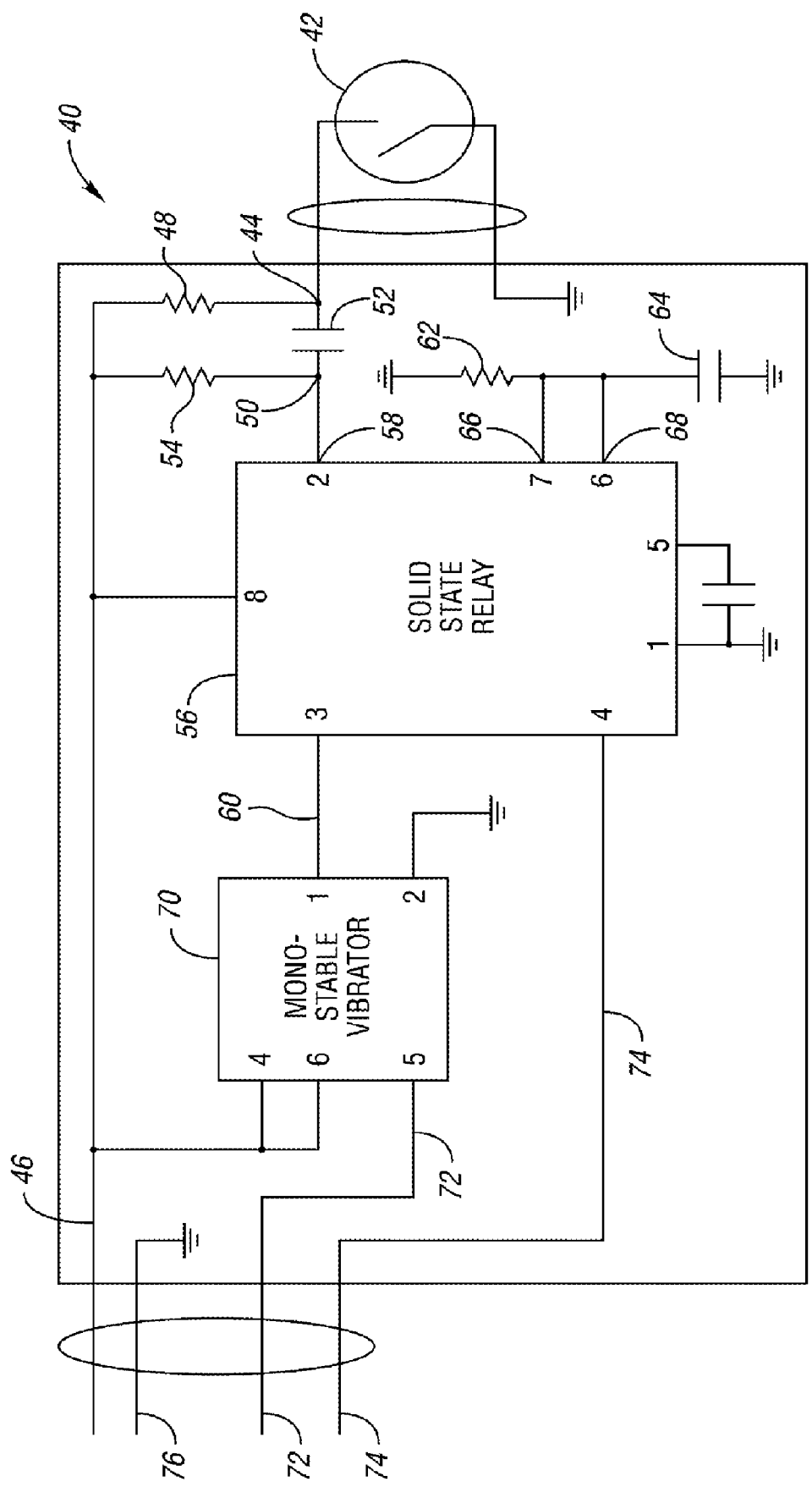
FIG. 2 is a schematic of a triggering circuit used in the fuel cell water purging system of the invention.

With reference to FIG. 2, a schematic of the triggering mechanism used in the system of the invention is provided. Triggering mechanism 40 includes thermostat 42 which upon sensing a temperature below a predetermined temperature sends a low voltage at position 44 which is separated from 12 volt power line 46 by resistor 48. The low voltage condition at position 44 causes a temporary low voltage condition at position 50 which is separated from position 44 by capacitor 52. Eventually, position 50 returns to a high voltage state by charging through resistor 54. Mono-stable multivibrator 56 senses this transition from low to high voltage at position 50 via trigger input 58, wherein output 60 goes high. The pulse width of the output pulse is determined by resistors 62 and capacitor 64, the junction of which is connected to inputs 66 and 68 of mono-stable multivibrator 56. When output 60 goes high, solid-state relay 70 closes and sends a signal to the vehicle control system via output 72. Finally, mono-stable multivibrator senses when the engine is turned on and reset via input 74. The vehicle uses input 74 to inhibit another second tier shutdown until recycling the ignition key resets the circuit. The system is grounded by input 76.

In another embodiment of the present invention, a method of removing moisture from a fuel cell stack is provided. The presence of water in the liquid phase in a fuel cell stack and system is especially undesirable should the temperature drop below freezing since the membranes in the fuel cell stack are subject to degradation and destruction by ice formation and expansion.

Figure 3:
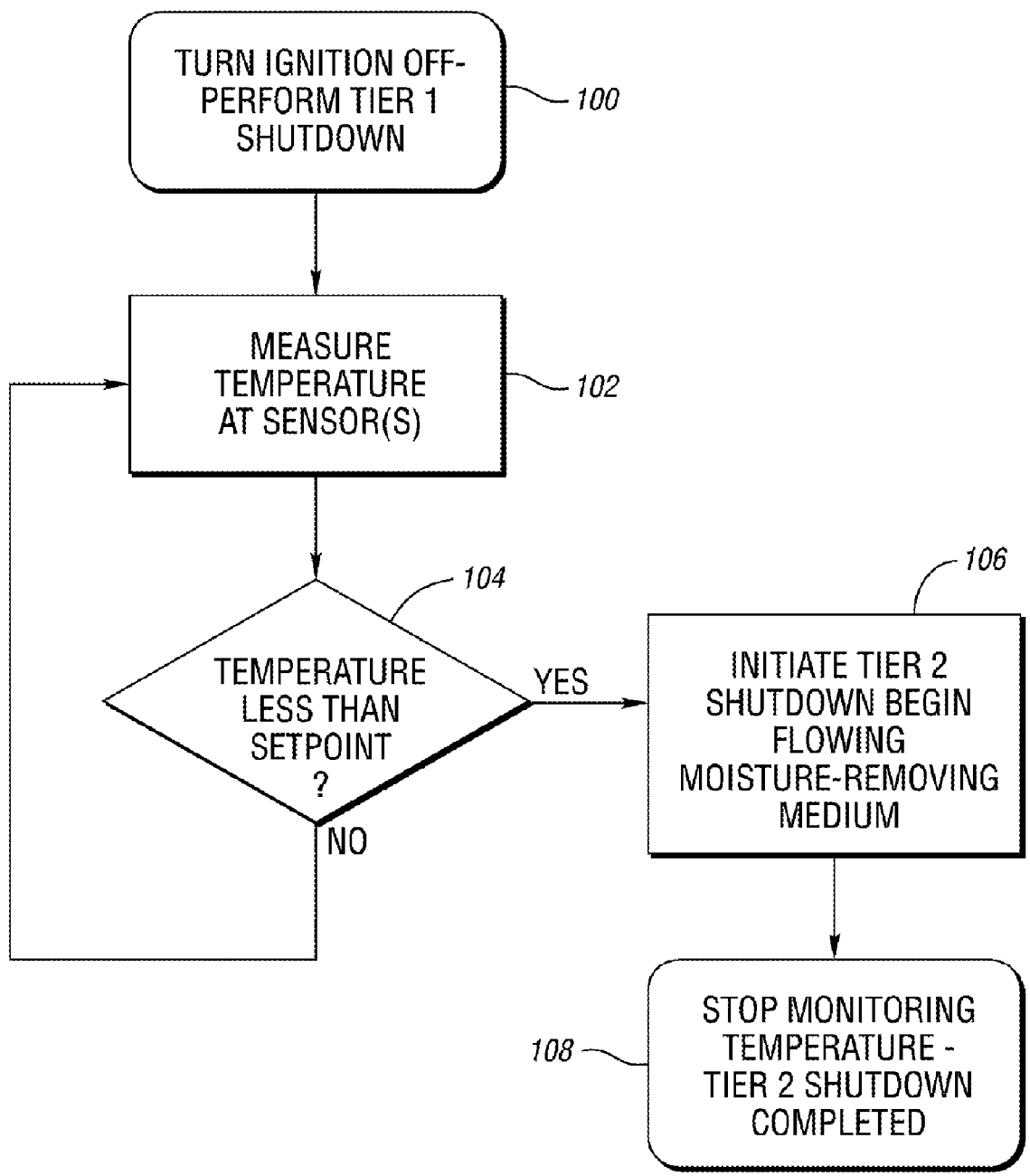
FIG. 3 is a flowchart summarizing the method of the invention.

With reference to FIG. 3, a flowchart summarizing the method of the invention is provided. The method of the invention is initiated as indicated by block 100 in which a Tier 1 shutdown is performed when the ignition is turned off (i.e., in a Tier 1 shutdown which is initiated when the ignition key is shut off). Tier 1 shutdown means that the ignition is turned off but the temperature is still monitored. The ambient temperature in the vicinity of the fuel cell is measured as indicated by block 102.

In certain embodiments, a time delay condition can be introduced into the method of the present invention. The time delay condition accounts for situations where the vehicle driver may restart the vehicle in a relatively short amount of time after shut off. In these situations, Tier 2 shut down may not be necessary because of the relatively quick vehicle restart. Upon restart, operation of the vehicle substantially precludes formation of ice particles on the fuel cell. Moreover, Tier 2 can be delayed until the thermal energy of the fuel cell and system and surrounding structures has dissipated. The release of this thermal energy hinders the formation of ice particles, and in some scenarios, the release may be sufficient to preclude ice particle formation. In these scenarios, Tier 2 may not be necessary.

Figure 4:
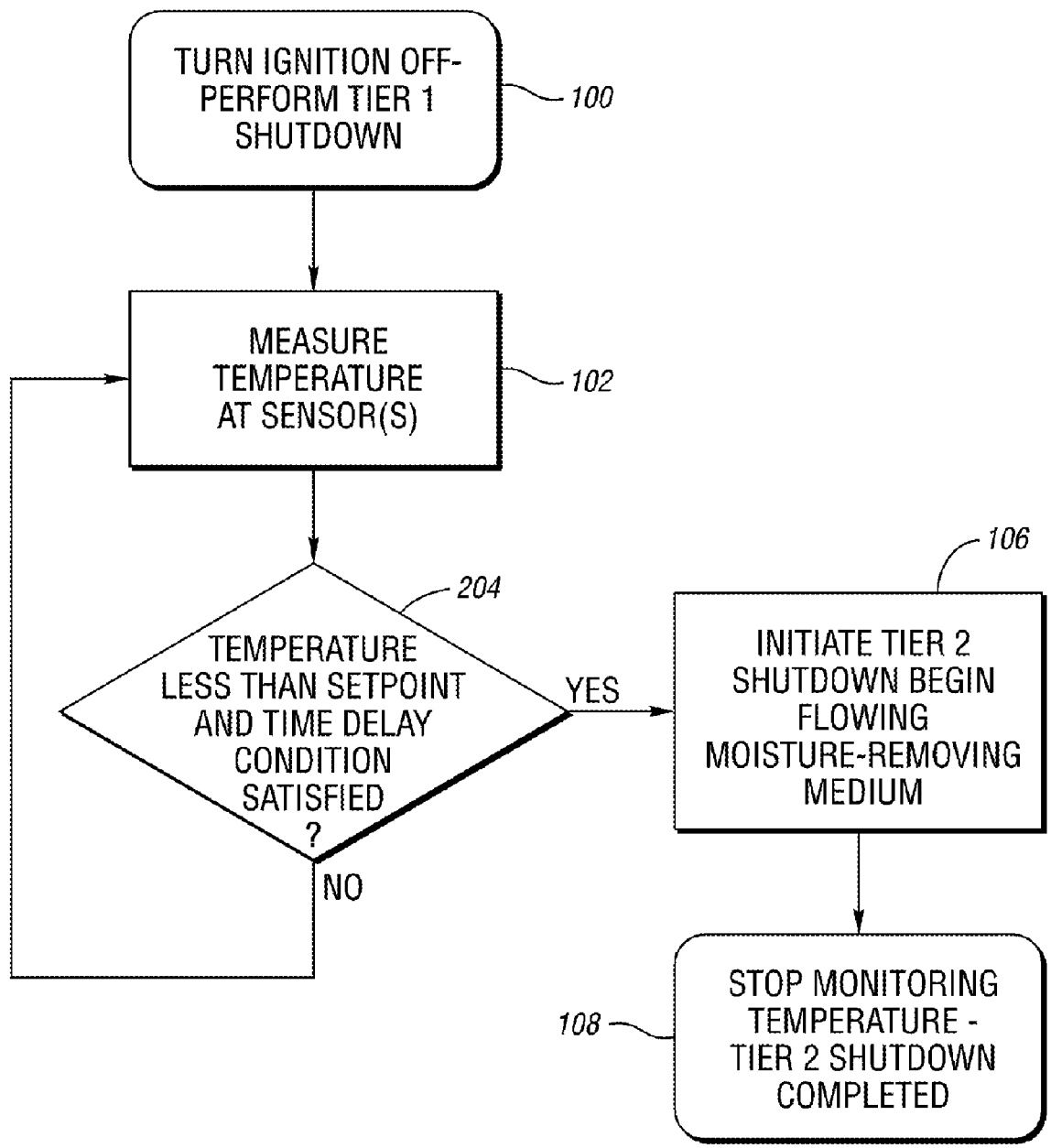
FIG. 4 is a flowchart summarizing another method of the present invention.

FIG. 4 depicts the integration of the time delay condition. Decision block 204 tests whether the temperature is less than the set point and whether the time delay condition is met by comparing an elapsed time with a time delay period. If the elapsed time exceeds the time delay period, then the time delay condition has been satisfied. More specifically, after shut off of the ignition key, the elapsed time can be continuously or intermittently measured by an electronic timer or like device. In certain embodiments, the time delay period is at least partially a function of one or more of thermal mass and thermal conductivity of the fuel stack and system. In certain embodiments, the delay is between 5 and 80 minutes, in other embodiments, the delay is between 45 and 55 minutes.

In certain embodiments, the time delay period can be set based on ambient temperature and fuel cell system temperature data stored in a lookup table in computer memory. The time delay period can be correlated as a function of ambient temperature and a fuel cell system temperature measurement. The difference between these temperatures indicates heat transfer from system temperature to ambient temperature. In certain embodiments, implementation of this setting functionality may include the use of two sensors. The first sensor is typically implemented to measure ambient temperature. The second sensor is used to measure the fuel cell system temperature.

If the condition(s) of block 104 or block 204 are satisfied, a Tier 2 shutdown is initiated as indicated by block 106 by commencing flow of a moisture-removing medium. The moisture removing medium may be any gas that is capable of removing moisture. Inexpensive examples include air and nitrogen. The moisture removing medium may be carried in a separate tank on the vehicle. However, the preferred moisture removing medium is air which may be used with the aid of a compressor carried on the vehicle. The moisture-removing medium is flowed long enough so that at least a portion of the water is removed from the fuel cell. Specifically, the moisture removing medium is flowed through the fuel cell for a sufficient time to remove a sufficient amount of the water in the fuel cell so that the fuel cell is not degraded or damaged by freezing of water. In practice, when the ambient temperature drops below the predetermined temperature, a signal is generated that wakes up a vehicle system controller to initiate a second tier shutdown. The Tier 2 shutdown is completed with the temperature no longer being monitored (block 108.) If the temperature is not less than the set point, the temperature is repeatedly remeasured.

The step of measuring the ambient temperature is performed continuously or at successive time intervals while the vehicle is shut down until the vehicle is operated. The temperature measurement may be performed by any suitable temperature sensor such as a thermostat element, a thermal switch, or the like. A suitable thermal switch is Texas Instruments Klixon 4286. Moreover, the temperature measuring device may be positioned at any position in the vehicle wherein a temperature measurement provides information about the temperature of the fuel cell stack. Specifically, the temperature sensor may be placed exterior to the fuel cell at a location within the vehicle that is correlated to fuel cell temperatures. Suitable positions include, for example, in the coolant that precedes the inlet to the fuel cell stack or at a position exterior to the fuel cell at a location within the same compartment as the fuel cell, in the ambient atmosphere adjacent to the fuel cell stacks (composed of air and $H_2$), or in the water (i.e., the deionized water) in the fuel cell.

The predetermined temperature used in the practice of the invention is preferably greater than or equal to about 0° C. More preferably, the predetermined temperature will be equal or greater than about 3° C. A useful range for the predetermined temperature is from about 3° C. to about 7° C. Once the moisture-removing medium has started to flow through the fuel stack, it is important that it continue for a sufficient time to remove essentially all of the humidity. This amount of time can be dynamically determined by utilizing sensors within the fuel stack that senses when the amount of water has dropped to a predetermined low level. Alternatively, the amount of time can be determined empirically by a calibration procedure. That is, a fuel cell with a typical amount of humidity is subjected to an airflow and the amount of time necessary to remove the water is measured. An amount of time greater than this empirically determined time is then used for all operating fuel cell vehicles.

For a given vehicle shut down sequence, it is only necessary that the moisture-removing medium be flowed once through the fuel cell. Therefore, in a particularly preferred embodiment of the invention, the occurrence of the step of flowing the moisture-removing medium through the fuel cell sets a flag so that if the vehicle warms up above the predetermined temperature and then subsequently drops below the predetermined temperature the flowing step is not repeated until the engine goes through another drive cycle. As used herein, the term "drive cycle" refers to the sequence in which the vehicle is started and then turned off. Therefore, if the temperature measuring device is a thermal switch, the switch can reset itself to enable itself to check again for when the ambient temperature drops below the predetermined temperature when the vehicle is shutdown again by turning the ignition key off (tier one shutdown.) Implementation of this feature of the invention may be performed by the use of a common thermal switch (such Texas Instruments Klixon 4286) or a temperature sensor. Either method (switch or sensor) may use an electronic hardware circuit such as a one-shot timer circuit or a microprocessor with software to implement the required control logic described above.

In a particularly preferred embodiment of the invention, the method of removing moisture includes the ability to allow only one air flowing cycle for each vehicle shutdown.

In this embodiment, the method comprises measuring the temperature in the vicinity of a fuel cell vehicle when the fuel cell vehicle has been shut down and flowing the air through the fuel cell when the ambient temperature drops to a predetermined temperature. The air is flowed long enough so that at least a portion of the water is removed from the fuel cell system. Specifically, the air is flowed through the fuel cell system for a sufficient time to remove a sufficient amount of the water in the fuel cell so that the fuel cell system is not degraded or damaged by freezing of water and the occurrence of the step of flowing the moisture-removing medium through the fuel cell is remembered by a controller that turns on the air flow, so that if the vehicle warms up above the predetermined temperature and then subsequently drops below the predetermined temperature step b is not repeated until the engine goes through another turn on and shut down cycle. In this particularly preferred embodiment, the step of measuring the ambient temperature is performed in the same manner as set forth above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of freeze protection for a fuel cell powered vehicle, the method comprising:
    a) measuring an ambient temperature in the vicinity of a fuel cell vehicle when the fuel cell vehicle has been shut down; and
    b) providing a flow of moisture-removing medium through the fuel cell when the ambient temperature drops to a predetermined temperature, wherein the medium is flowed through the fuel cell for a sufficient time to remove a sufficient amount of the water in the fuel cell so that the fuel cell is not degraded by freezing of water,
    wherein for a given engine shutdown, the occurrence of the step of providing the flow of moisture-removing medium through the fuel cell sets a flag so that if the vehicle warms up above the predetermined temperature and then subsequently drops below the predetermined temperature step b is not repeated until the engine goes through another start up and shutdown cycle.

2. The method of claim 1 wherein the step of measuring the ambient temperature is performed continuously or at successive time intervals while the vehicle is shut down until the vehicle is operated.

3. The method of claim 1 wherein the step of measuring the ambient temperature is performed continuously or at successive time intervals until the temperature in the vicinity of the fuel cell drops below the predetermined temperature.

4. The method of claim 1 wherein the step of measuring the ambient temperature is performed by a temperature sensor.

5. The method of claim 4 wherein the fuel cell includes an inlet and the temperature sensor is placed in the coolant that precedes the inlet to the fuel cell, in the ambient atmosphere adjacent to the fuel cell, or in the water in the fuel cell.

6. The method of claim 4 wherein the temperature sensor is placed exterior to the fuel cell at a location within the vehicle that is correlated to fuel cell temperatures.

7. The method of claim 1 wherein the predetermined temperature is greater than or equal to about 0° C.

8. The method of claim 1 wherein the predetermined temperature is from about 3° C. to about 7° C.

9. The method of claim 1 wherein the sufficient time for flowing the medium through the fuel cell is determined to be greater than the time to remove essentially all the water in a fuel cell is measured.

10. The method of claim 1 wherein the moisture-removing medium is air or nitrogen gas.

11. A method of removing moisture from a fuel cell, the method comprising:
    a) measuring the temperature in the vicinity of a fuel cell vehicle when a vehicle ignition has been turned off; and
    b) flowing air through the fuel cell when the ambient temperature drops to a predetermined temperature, wherein the air is flowed through the fuel cell for a sufficient time to remove a sufficient amount of the water in the fuel cell so that the fuel cell is not degraded by freezing of water and the occurrence of the step of flowing air through the fuel cell is remembered by a controller that turns on the air, so that if the vehicle warms up above the predetermined temperature and then subsequently drops below the predetermined temperature step b is not repeated until the engine goes through another turn on and shut down cycle.

12. The method of claim 11 wherein the step of measuring the ambient temperature is performed continuously or at successive time intervals while the vehicle is shut down until the vehicle is operated.

13. The method of claim 11 wherein the step of measuring the ambient temperature is performed continuously or at successive time intervals until the temperature in the vicinity of the fuel cell drops below the predetermined temperature.

14. The method of claim 11 wherein the step of measuring the ambient temperature is performed by a temperature sensor.

15. The method of claim 14 wherein the fuel cell includes an inlet and the temperature sensor is placed in the coolant that precedes the inlet to the fuel cell, in the ambient atmosphere adjacent to the fuel cell, or in the water in the fuel cell.

16. The method of claim 14 wherein the temperature sensor is placed exterior to the fuel cell at a location within the vehicle that is correlated to fuel cell temperatures.

17. The method of claim 11 wherein the predetermined temperature is greater than or equal to about 0° C.

18. The method of claim 11 wherein the predetermined temperature is from about 3° C. to about 7° C.

* * * * *